(12) United States Patent
Houlberg

(10) Patent No.: US 6,353,634 B1
(45) Date of Patent: Mar. 5, 2002

(54) VIDEO DECODER USING BI-ORTHOGONAL WAVELET CODING

(75) Inventor: Christian L. Houlberg, Ventura, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/213,475

(22) Filed: Dec. 17, 1998

(51) Int. Cl.[7] .................................................. H04N 7/12
(52) U.S. Cl. .................................................. 375/240.19
(58) Field of Search ........................... 375/240, 240.18, 375/240.19, 240.11; 710/68; 324/158.1; 714/724; 341/51

(56) References Cited

U.S. PATENT DOCUMENTS

| | | | | |
|---|---|---|---|---|
| 5,150,048 A | * | 9/1992 | McAuliffe et al. | .......... 714/724 |
| 5,159,336 A | * | 10/1992 | Rabin et al. | .................. 341/51 |
| 5,614,818 A | * | 3/1997 | El Ayat et al. | ........... 324/158.1 |
| 5,838,377 A | * | 11/1998 | Greene | ................... 375/240.11 |
| 6,205,499 B1 | * | 3/2001 | Houlberg et al. | .............. 710/68 |

* cited by examiner

Primary Examiner—Chris Kelley
Assistant Examiner—Allen Wong
(74) Attorney, Agent, or Firm—David Kalmbaugh

(57) ABSTRACT

A video decoder for decompressing video data to recreate highly accurate and detailed video images. The video decoder includes a programmable gate array which receives a serial data stream of compressed video data containing 32 bit data words. The programmable gate array converts the serial data stream of compressed video data to a parallel format comprising four eight bit bytes which are sequentially written into a multiformat video codec. The multiformat video codec is a video decoder optimized for real-time decompression of interlaced digital data. The decompression algorithm for the multiformat video codec is based on the bi-orthogonal (7,9) wavelet transform and implements field independent sub-band coding. The decompressed video data is supplied to an imaging device which recreates video images.

19 Claims, 15 Drawing Sheets

VIDEO DECODER USING BI-ORTHOGONAL WAVELET CODING

BACKGROUND OF THE INVENTION

1. Field of the Invention

This invention relates generally to video signal decoding systems. More particularly, the present invention is concerned with a digital decoding system for decoding video signals which uses bi-orthogonal wavelet coding to decompress digitized video data.

2. Description of the Prior Art

There is currently a need for the reliable transmission and reception of real time television video and/or television sub video over a narrow bandwidth. For example, in the transmission of telemetry video data from a missile the telemetry channel may have a bandwidth of two megahertz or even substantially less than two megahertz.

Prior art methods and apparatus for compressing and subsequently decompressing real time video data include Adaptive Differential Pulse Code modulation (ADPCM), Joint Photography Experts Group (JPEG) and Motion Picture Experts Group (MPEG). These methods of encoding and then decoding real time video data are generally not capable of sufficient bandwidth reduction or are susceptible to excessive data loss in a noisy environment.

For example, Adaptive Differential Pulse Code modulation, which is used by the International Range Instrumentation Group to transmit telemetry data, is noise immune, however, it is not capable of real time video data compression to allow accurate and reliable transmission of the data over a channel narrower than five megahertz. Even moderately complex video images overload an ADPCM encoder and its associated decoder causing it to lose fields and even multiple frames of video data.

Both Joint Photography Experts Group and Motion Picture Experts Group methods and encoders are capable of compressing and then decompressing real time video data sufficiently to allow the data to be transmitted-over a two megahertz channel, however, these methods and encoders are susceptible to noise. A single noise hit, for example, can cause the lose of an entire video field or even multiple fields. In addition, JPEG and MPEG encoding and subsequent decoding can distort an image with the random appearance of square blocks caused in a noisy environment by a reflection of eight by eight pixel discrete cosine transform used encode the video data.

Accordingly, there is a need for an encoder to accurately and reliably encode complex video data which will allow for its transmission over a bandwidth of two megahertz without distortion of the data caused by noise. There is also a need for a decoder which will accurately and reliably decode the encoded data when the data is received at its destination.

SUMMARY OF THE INVENTION

The present invention overcomes some of the disadvantages of the prior art including those mentioned above in that it comprises a highly reliable and effective video decoder for decompressing video data to allow the video data to be used to recreate highly accurate and detailed video images when the data is received and processed at its destination.

The video decoder of the present invention includes a programmable gate array which receives a serial data stream of compressed video data containing 32 bit data words. The programmable gate array converts the serial data stream of compressed video data to a parallel format comprising four eight bit bytes which are sequentially written into a multiformat video codec. The multiformat video codec is a video encoder/decoder optimized for real-time decompression of interlaced digital data. The decompression algorithm for the multiformat video codec is based on the bi-orthogonal (7,9) wavelet transform and implements field independent sub-band coding.

The programmable gate array includes a most significant sync word decoder for receiving and decoding a thirty two bit word of a Mallat block of video data. Whenever a thirty two bit word comprises thirty two logic ones the most significant sync word decoder decodes the word providing a logic one at its output.

The programmable gate array also includes a least significant sync word decode. Whenever the most significant sync word decoder provides a logic one at its output, the least significant sync word decoder will process the next word of the Mallat block to determine whether a Mallat block header is present. Whenever the least significant sync word decoder decodes and then provides at its output a logic one a Mallat block header is present.

The logic ones from the most and least significant sync word decoders are supplied to an AND gate which then generates a sync signal indicating the presence of a Mallat block of compressed video data. The sync signal is supplied to a read write controller and byte select controller within the programmable gate array. The byte select controller generates four sequential byte enable signals for each eight bit byte of a thirty two bit word to be written into codec, while the read write controller generates the write signals for writing the four data bytes into codec.

An eight bit serial to parallel shift register included in the programmable gate array converts the serial data stream of compressed video data into the eight bit bytes of compressed video data allowing the compressed video data to be written into the multiformat video codec. Control signals for the shift register are generated by the read write controller.

DETAILED DESCRIPTION OF THE PREFERRED EMBODIMENT

Figure 1A:
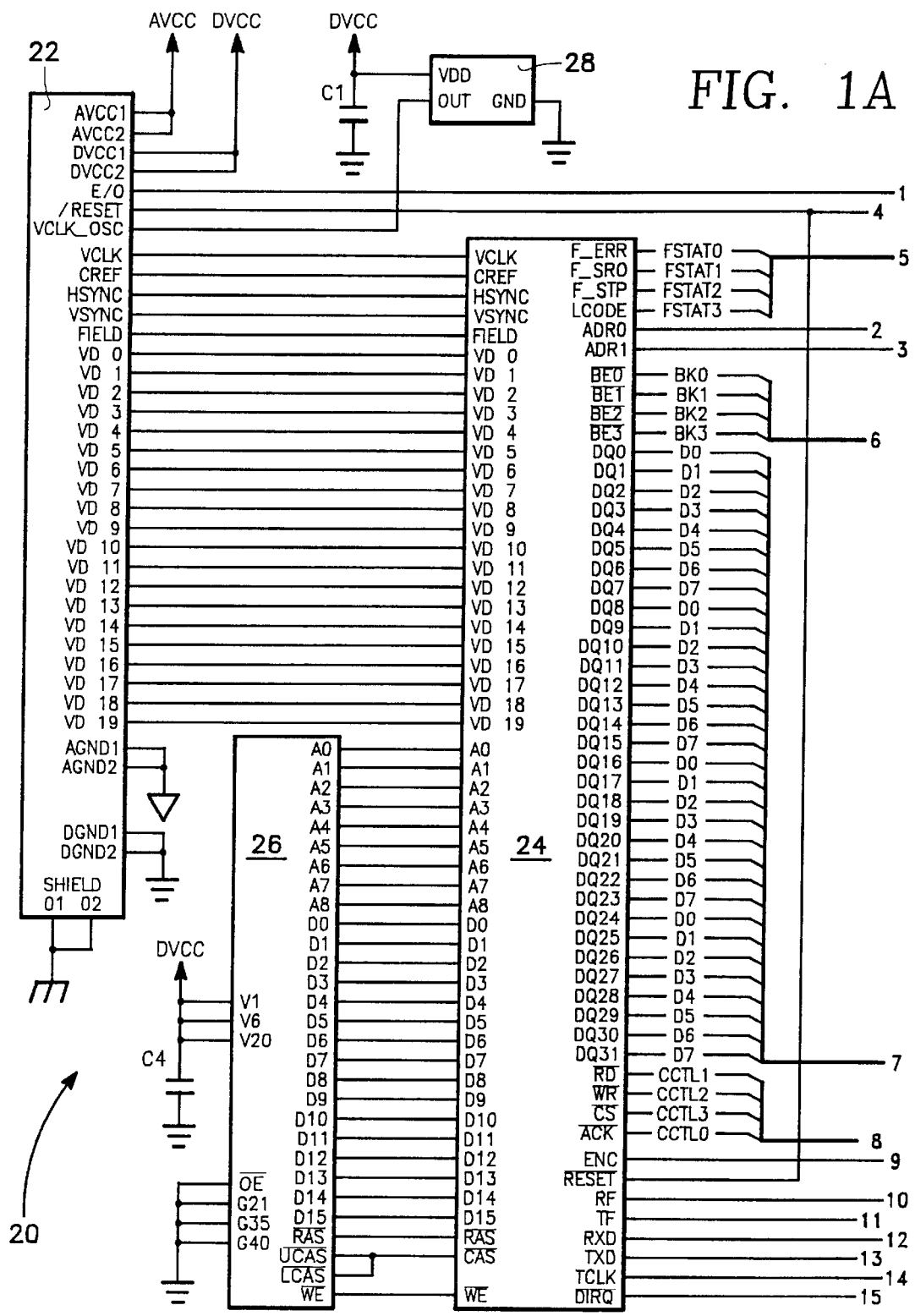
FIGS. 1A–1F is a detailed electrical schematic diagram of the video decoder which constitutes a preferred embodiment of the present invention.
Figure 1B:
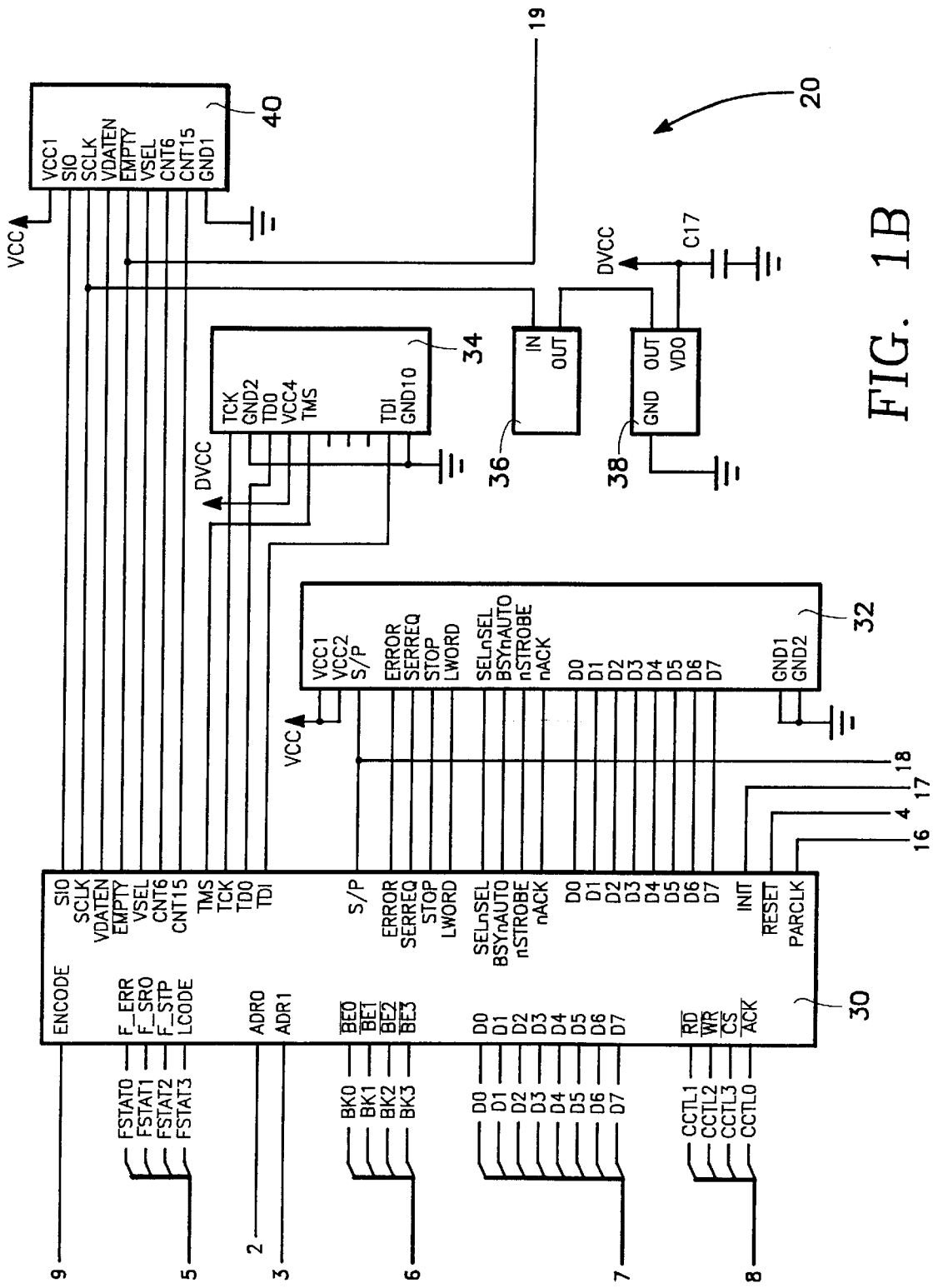

Referring now to FIGS. 1A–1F, there is depicted in FIGS. 1A–1F a video decoder 20 which decompresses video data which is usually transmitted over a bandwidth of two megahertz or less. Video data is supplied from decoder 20 to a digital multistandard colour encoder (not illustrated) 20 via an input terminal 22. The data supplied to the digital multistandard colour encoder by decoder 20 has 16 digital bits with eight bits comprising the digital luminance signal (Y) and eight bits comprising the colour difference or chrominance signal (UV). This data is provided as 16-bit YUV-bus transfer digital data. The colour encoder may, in turn, provide an analog video signal to a video camera, a video tracking device on board a missile or any other device which requires an analog video signal at its video input.

Coupled to terminal 22 is a multiformat video codec 24 which is a video encoder/decoder optimized for real-time compression and decompression of interlaced digital data. In the preferred embodiment of the present invention codec 24 operates as a decoder decompressing incoming video data. Coupled to multiformat video codec 24 is a dynamic random access memory (DRAM) 26 which functions as a temporary storage device storing decompressed data while codec 24 is decompressing data.

The multiformat video codec 24 includes an internal compression processor with the compression processor's compression algorithm being based on the bi-orthogonal (7,9) wavelet transform of Ingrad Daubechies. The compression processor's compression algorithm implements field independent sub-band coding. Sub-band coders transform two-dimensional spatial video data into spatial frequency filtered sub-bands. The quantization and entropy encoding processes provide the codec's data compression. Decoding of compressed video data follows the exact path as encoding but in reverse order.

Figure 1C:
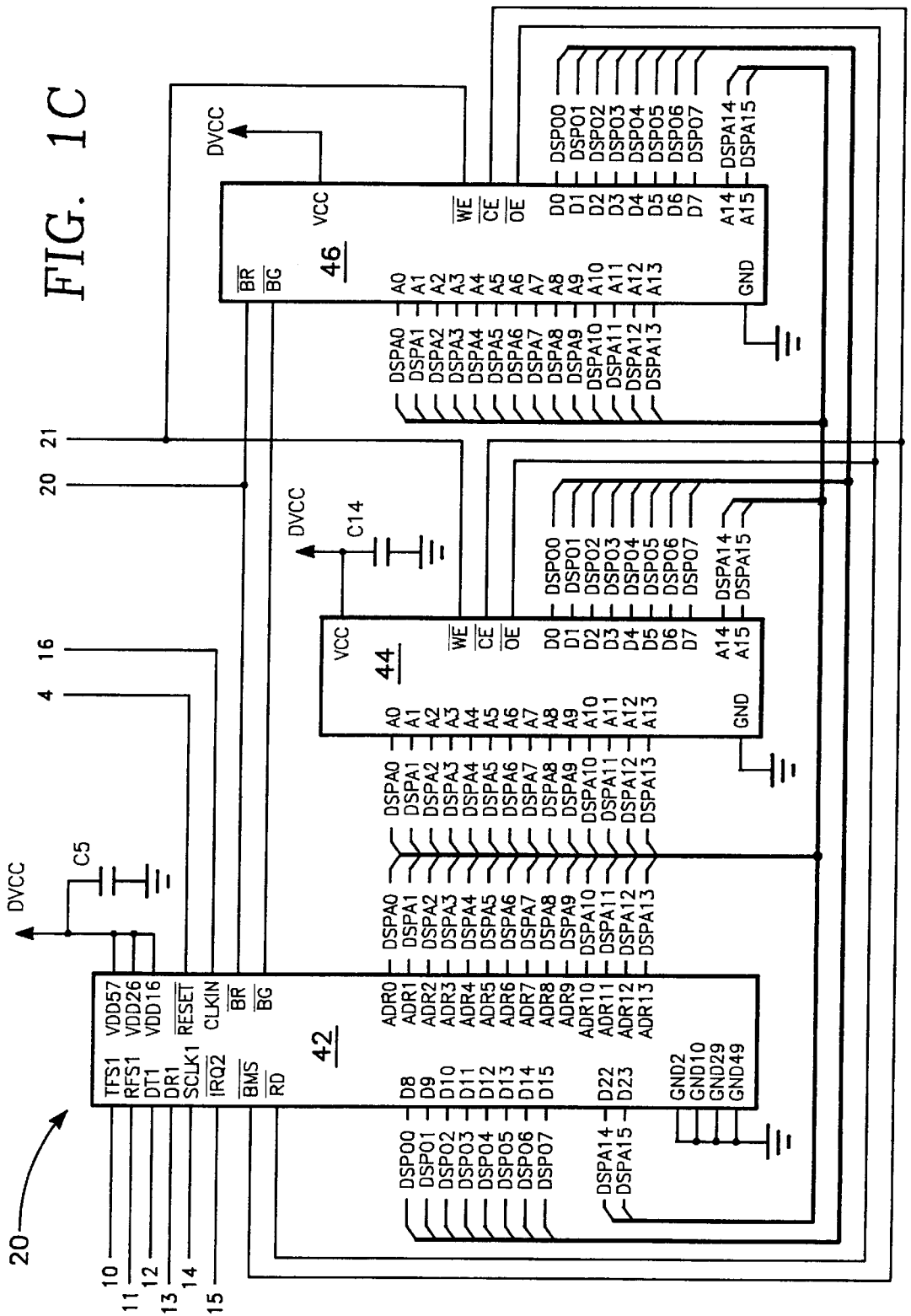
Figure 1D:
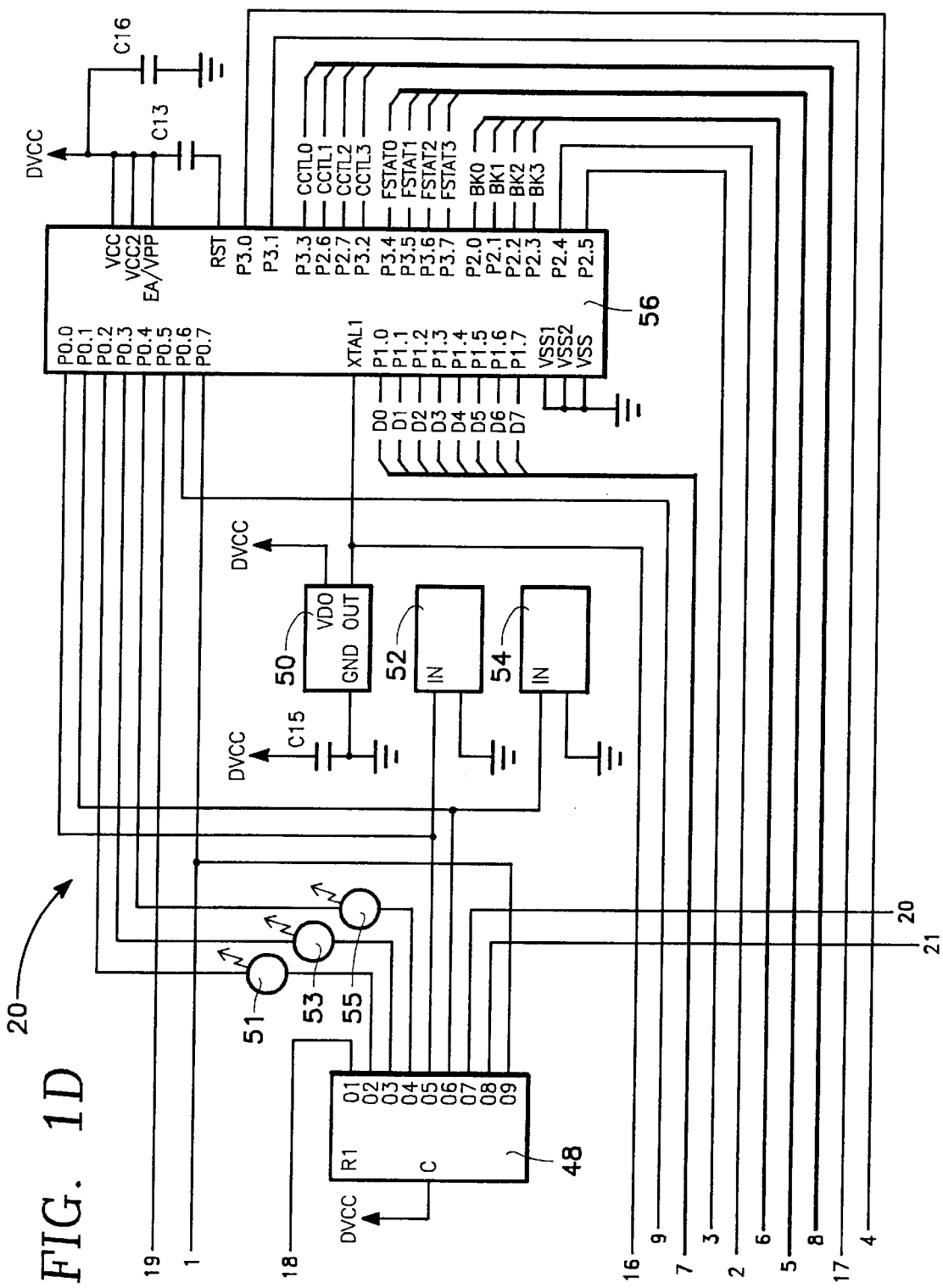

Although FIG. 1A and 1C depict a digital signal processor (DSP) 42 as being connected to multiformat video codec 24 there is no need for a digital signal processor when codec 24 operates as a decoder. When codec 24 operates as an encoder, digital signal processor 42 adjust the compression ratio for codec 24 while multiformat video codec 24 is compressing video data. For complex video images the compression ratio generally requires constant adjustment. Digital signal processor 42 monitors the quantity or amount of compressed 32 bit words provided by codec 24 during each field of video data.

However, when codec 24 operates as a decoder, there is no need to calculate bin widths because the bin width, that is compression ratio, is stored in the compressed image during encoding. It should be noted that a compression ratio of about 80 to 1 may be used to maintain a quality image.

Multiformat video codec 24 is a Model ADV601 multiformat video codec commercially available from Analog Devices of Norwood, Mass. Codec 24 comprises nine basic functional blocks with four of these blocks being interface blocks and five of the blocks being internal processing blocks. The interface blocks include a Digital Video I/O Port, a Host I/O Port, an external DRAM manager, and a DSP serial I/O Port. The functional blocks include a Wavelet Kernel, an On-Chip Transform Buffer, an Adaptive Quantizer, a Run Length Coder, and a Huffman Coder.

The Digital Video I/O Port provides a real-time uncompressed video interface to support a broad range of component digital video formats, including "D1". The Host I/O Port carry control, status, and compressed video to and from the host processor. A 512 position by 32-bit FIFO buffers the compressed video stream between the host processor and the Huffman Coder.

The DRAM Manager performs all tasks related to writing, reading, and refreshing the external DRAM. The external host buffer DRAM is used for reordering and buffering quantizer input and output values.

The Serial Port supports, during encode only, communication of wavelet statistics between the Wavelet Kernel and the Digital Signal Processor and quantizer control information between the Digital Signal Processor and the Quantizer. The user programmed compression ratio is also sent from the codec host interface to the Digital Signal Processor automatically.

The Wavelet Kernel gathers statistics on a per field basis and includes a block of filters, the interpolators, and decimators. The Wavelet Kernel calculates forward and backward bi-orthogonal, two-dimensional, separable wavelet transforms on horizontally scanned video data. The Wavelet Kernel uses the Transform Buffer when performing wavelet transforms calculated on an entire image's data to eliminate a need for extremely fast external memories. The resultant filtered image is made up of components of the original image and is identified as a modified Mallat Tree which includes Mallat the blocks of video data.

The On-chip Transform Buffer provides an internal set of SRAM for use by the wavelet transform kernel. The On-chip Transform Buffer provides enough delay line storage to support calculation of separable two dimensional wavelet transforms for horizontally scanned images.

The Adaptive Quantizer quantizes wavelet coefficients. This block compresses the filtered image based on the response profile of the human visual system. Quantize controls are calculated by the external Digital Signal Processor during encode operations. Each quantizer Bin Width (BW) is computed by Bin Width calculator software to maintain a constant compressed bit rate. A Bin Width is a per block parameter the quantizer uses when determining the number of bits to allocate to each block or sub-band.

The Run Length Coder performs zero and non-zero run length encoding/decoding for more efficient Huffman coding. The run-length coder looks for long strings of zeros and replaces it with short hand symbols. This data coding is optimized across the subbands and varies depending on the block being coded.

The Huffman coder/decoder is a digital compressor/decompressor that can be used for compressing digital data. The Huffman Coder performs Huffman coder and decoder functions on quantized run length coder coefficient values. The Huffman coder uses three ROM-coded Huffman tables that provide excellent performance for wavelet transformed video.

Essentially, a Huffman coder creates a table of the most commonly occurring code sequences and then replaces these codes with a short hand code.

Coupled to multiformat video codec 24 is a programmable gate array 30 which operates as an interface between codec 24 and an external host processor which may be a receiver which receives encoded video data from a telemetry system. Programmable gate array 30 converts serial encoded video data to a parallel format for processing by codec 24.

The programmable gate array 30 used in the preferred embodiment is a Model EPM7192 Field Programmable Gate Array commercially available from the Altera Corporation of San Jose, Calif.

Programmable gate array 30 is coupled to a serial interface connector 40 which, in turn, connects the programmable gate array 30 to the external host processor. Video decoder 20 also has a parallel interface connector 32.

The clock signal SCLK is supplied to programmable gate array 30 by the external host processor to clock data to array 30 from the external processor. Data is supplied to programmable gate array 30 from the external host processor via the SIO (serial data in out) line.

When jumper 36 is enabled oscillator 38 is connected to programmable gate array 30 supplying its clock signal to array 30. Oscillator 30 generally provides a 10–20 megahertz clock signal to programmable gate array 30.

A microcontroller 56 is connected to the multiformat video codec 24. Microcontroller 56 is used to initialize codec 24 upon power Up. The microcontroller 56 used in the preferred embodiment of the present invention is a Model 87C251 microcontroller chip commercially available from Intel corporation of Santa Clara, Calif.

Port P0 of microcontroller 56 is used to display error conditions which occur upon initialization and also to set the initialization mode which is the video encode/decode mode for video encoder 20. When MODE 0 and MODE 1 (P0.0 and P0.1 of microcontroller 56) are high the codec is initialized as an encoder or decoder. These logic ones are supplied to microcontroller 56 by a pull-up resistor array 56 which has nine resistors pulled up to 5 VDC. The mode of operation is selected by using jumpers 52 and 54. When neither jumper 52 and 54 is enabled, the mode of operation is the default mode which results in codec 24 operating as an encoder or decoder. An ENCODE/DECODE signal from the digital multistandard colour decoder is supplied to the P0.7 input of microcontroller 56. When the ENCODE/DECODE signal is high, codec 24 operates as an encoder. When the ENCODE/DECODE signal is low, codec 24 operates as an decoder.

Microcontroller 56 supplies data to codec 24 via its port P1. The bank select signals, control signals and address signals are provided to codec 24 via port P2 of microcontroller 56. Codec 24 sets its ENC output high only when codec 24 is operating as an encoder. Microcontroller 56 also has two address lines ADR0 and ADR1 which address one of four registers within codec 24. Address two addresses the 32 bit FIFO of codec 24 with ADR0 being a logic zero and ADR1 being a logic one. When ADR0 and ADR1 are high the control or status register is being addressed. When ADR0 and ADR1 are both low, the indirect data register of codec 24 is being addressed. When ADR1 is low and ADR0 is high, the indirect address register of codec 24 is being addressed.

An acknowledge signal (CCTL0) from codec 24 is provided to microcontroller 56 via P3.3 of microcontroller 56. The microcontroller 56 supplies control signals CCTL1, CCTL2 and CCTL3 to codec 24. These signals are respectively a read signal, a write signal and a chip select signal with each signal being active low and the write signal being a pulse signal. The chip select signal as well as addressing and bank select signals must be on prior to using the write signal to write data from microcontroller 56 into codec 24.

Programmable gate array 30 writes data to the multiformat video codec 24 in eight bit bytes. The data is supplied from array 30 to codec 24 in 32 bits words. This, in turn, necessitates that programmable gate array 30 write the data into codec 24 in four eight bit bytes. Programmable gate array 30 supplies four byte enable signals /BE0, /BE1, /BE2 and /BE3 to codec 24 to allow codec 24 to sequentially receive four eight bit bytes of data from array 30. The order in which the data is written into a FIFO (first in first out) within codec 24 is byte 0, byte 1, byte 2 and byte 3 which then allows the FIFO within codec 24 to increment to the next 32 bit word.

Coupled to programmable gate array 30 is a connector 34 which allows the user of video encoder 20 to program gate array 30 using an external programming device. Connector 34 also allows the user of video encoder 20 to test gate array 30.

Figure 1E:
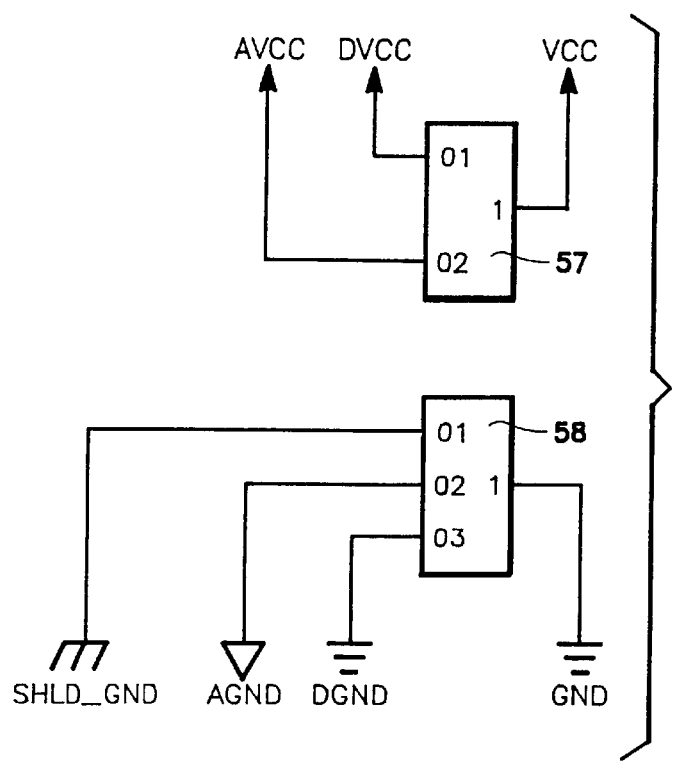
Figure 1F:
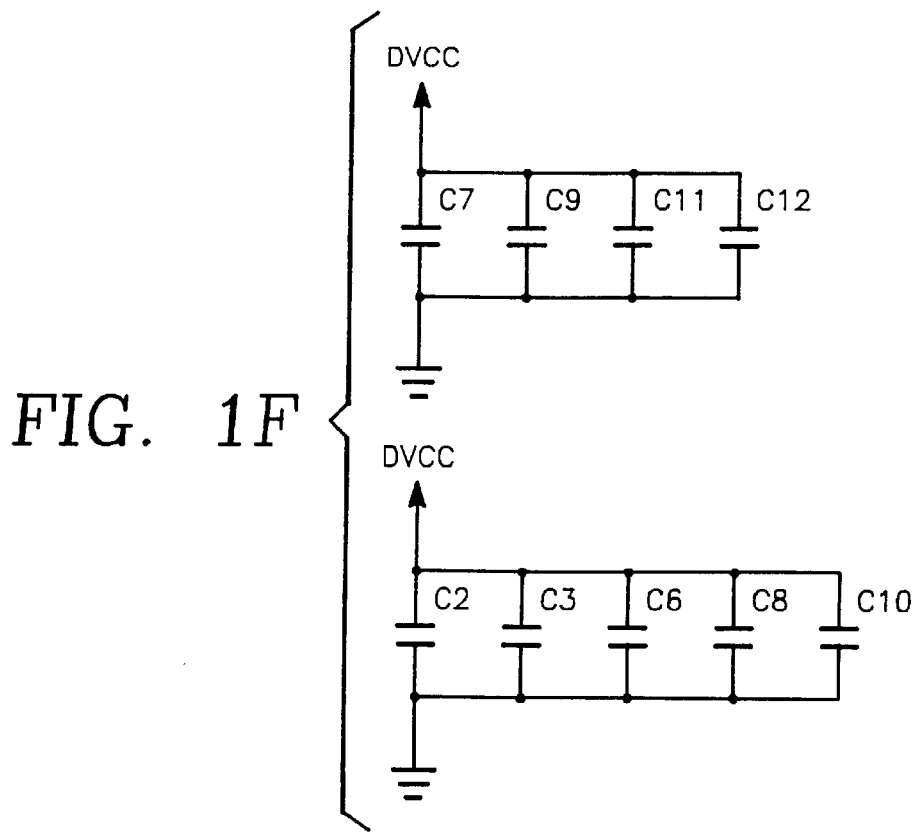
Figure 2:
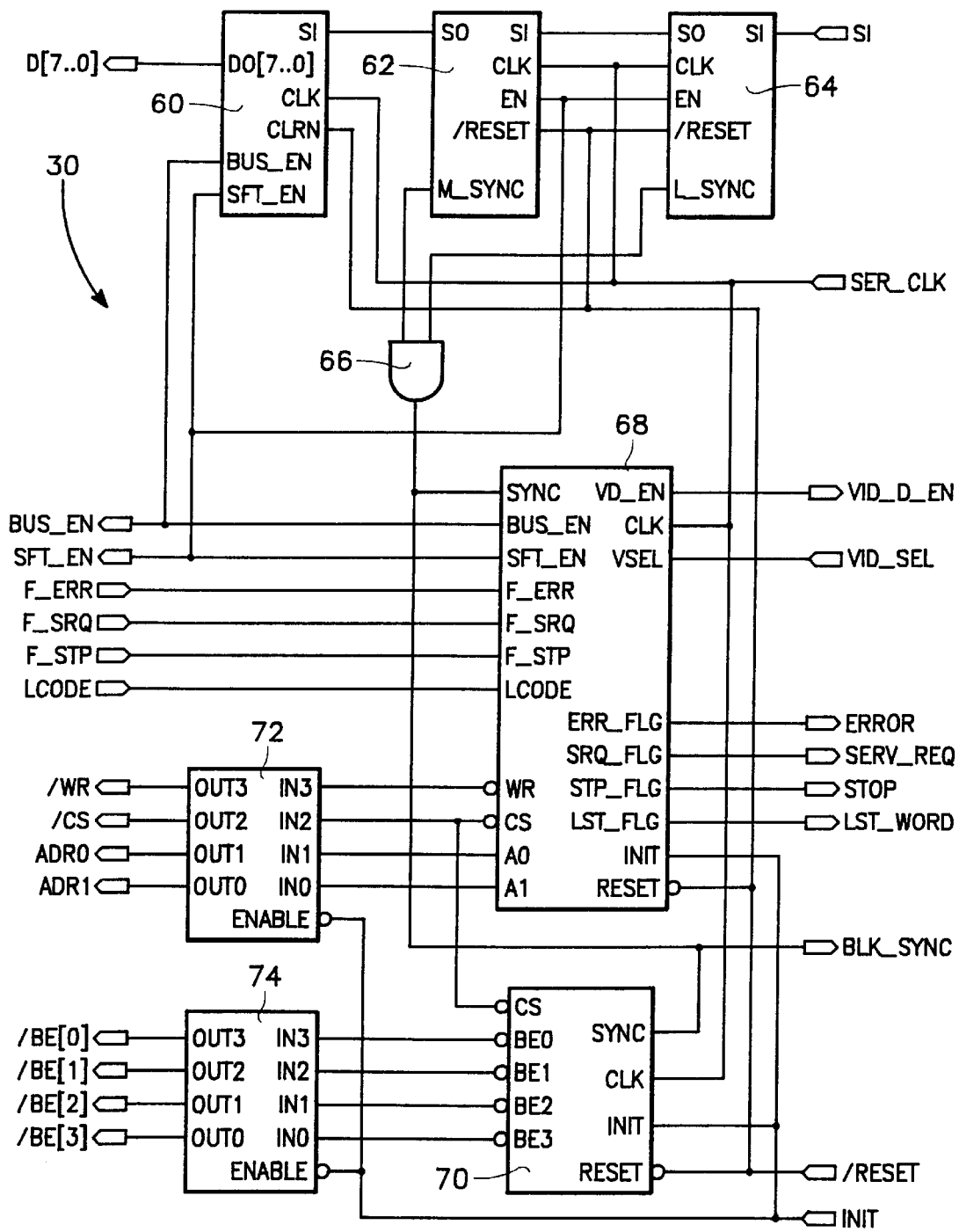
FIG. 2 is an electrical block diagram of the programmable gate array of FIG. 1B.
Figure 3A:
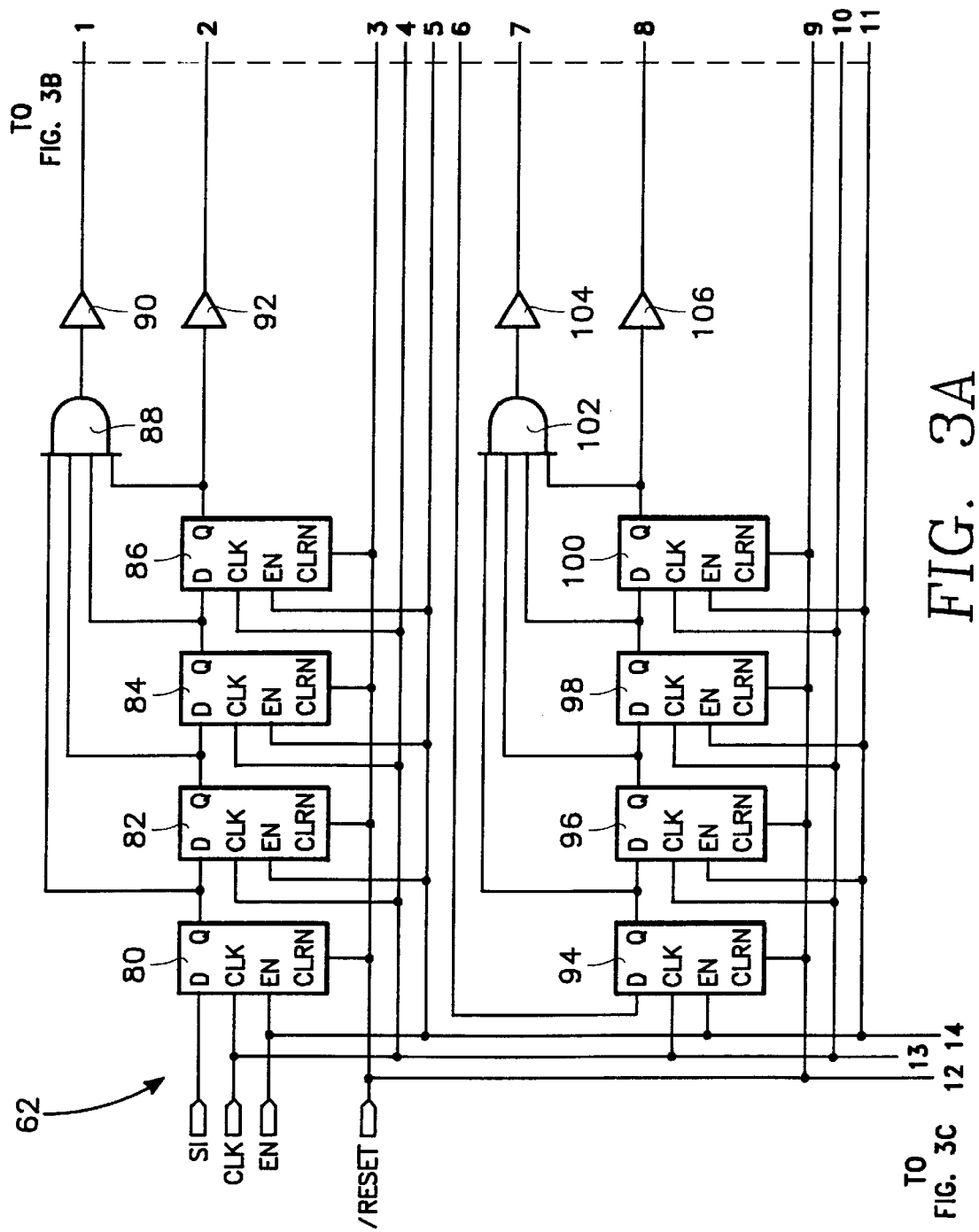
FIGS. 3A–3D is a detailed electrical schematic diagram of the most significant sync word decoder of FIG. 2.
Figure 3B:
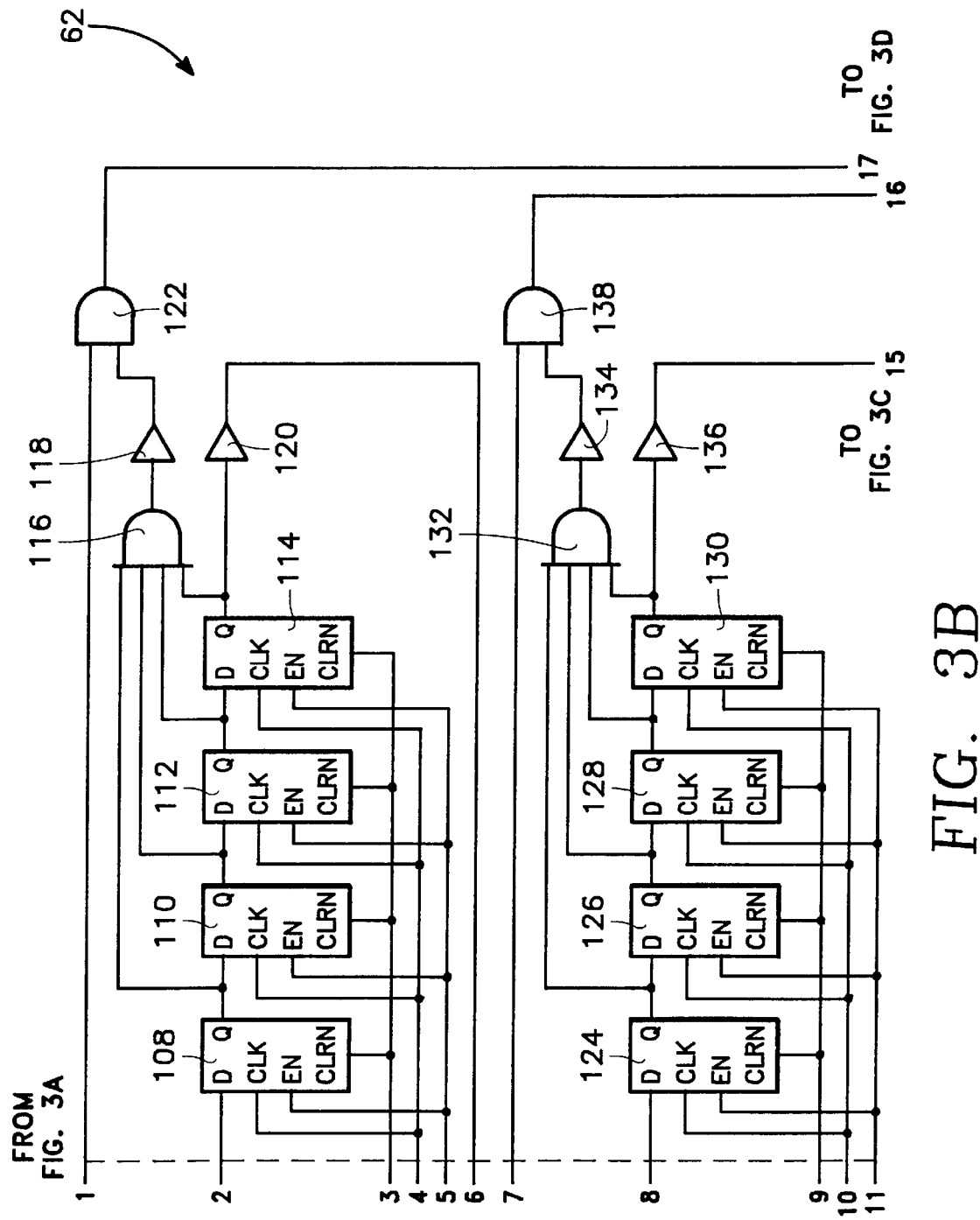
Figure 3C:
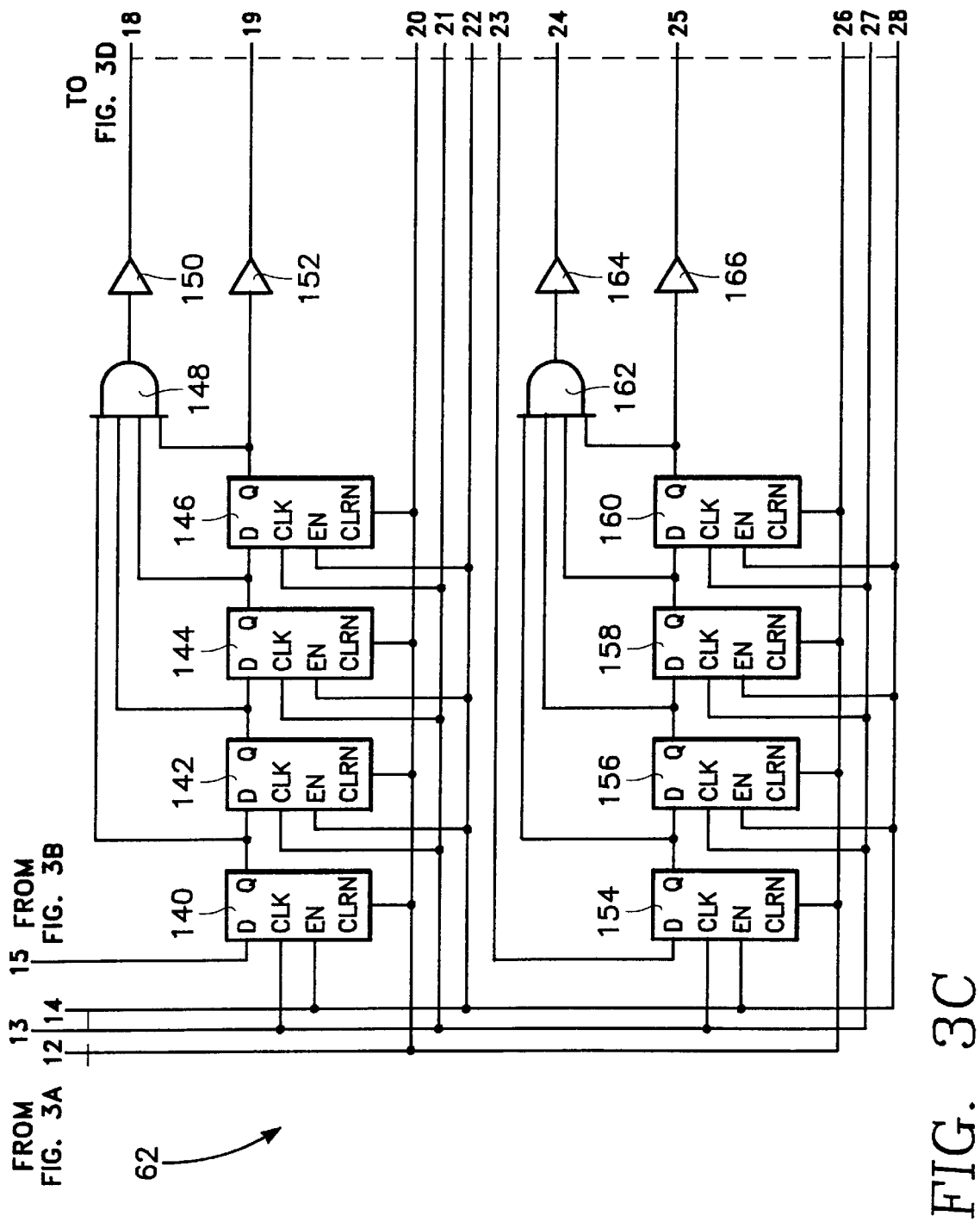
Figure 3D:
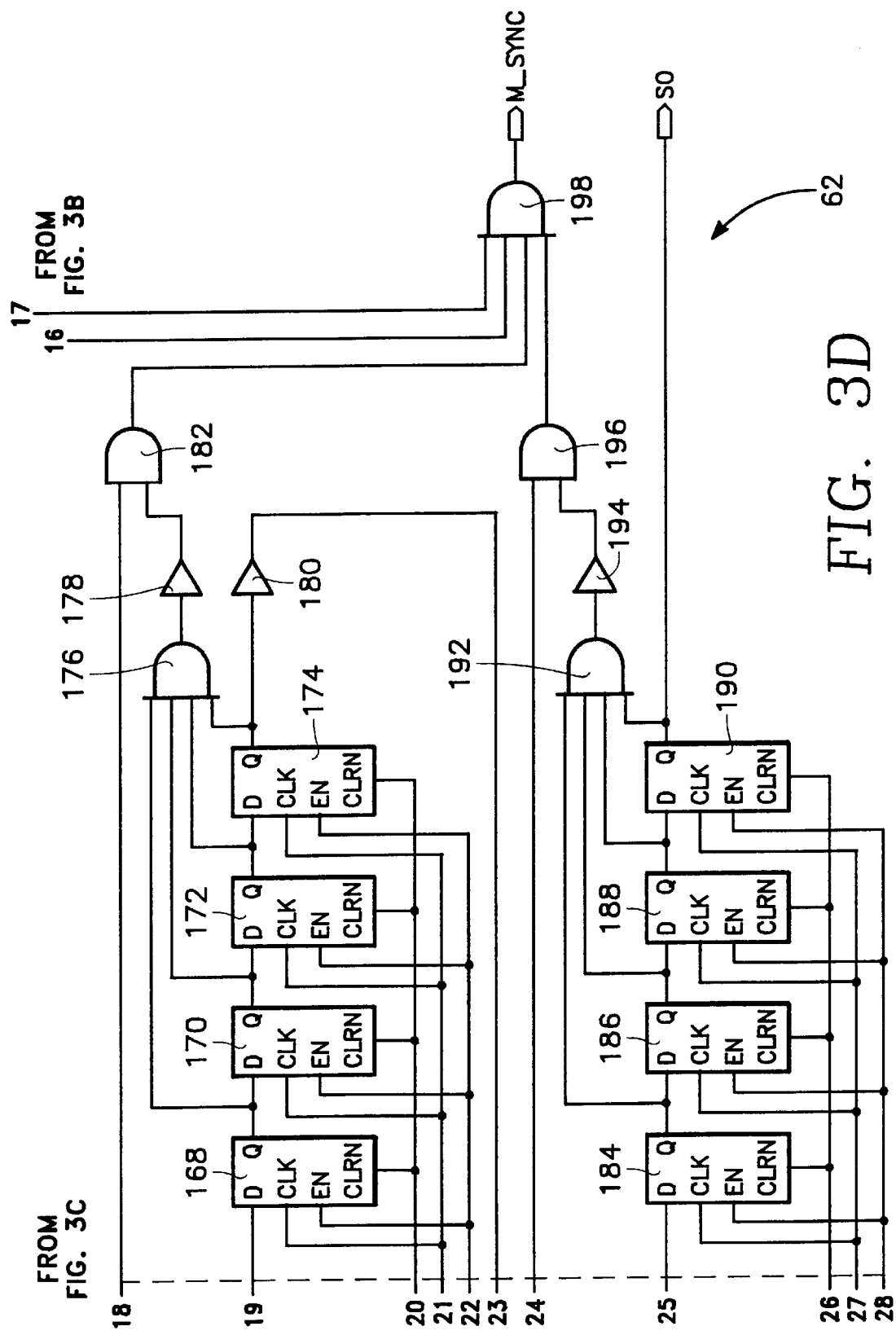

Referring to FIGS. 1A–1F, 2 and 3A–3D, there is shown in FIGS. 3A–3D, the most significant sync word decoder 62 of the programmable gate array 30 of FIG. 2. Decoder 32 receives at its SI input each thirty two bit word of a Mallat block of video data. Whenever a thirty two bit word of a Mallat block of video data comprises thirty two logic ones decoder 32 will decode this word and provides at its M_SYNC output a logic one. It should be noted that thirty two logic ones generally indicate that the word is the first or most significant word of a Mallet block header, however, it should be understood that the thirty two logic ones may contain video data.

When a thirty two bit word having thirty two logic ones is shifted through decoder 62, the Q outputs of latches 80–86, 94–100, 108–114, 124–130, 140–146, 154–160, 168–174 and 184–190 will be at the logic one state. This, in turn, will result in logic ones at the outputs of AND gates 88, 102, 116, 132, 148, 162, 176 and 192. The outputs of AND gate 88 and AND gate 116 are supplied to AND gate 122 resulting in a logic one at the output gate 122. Similarly, the outputs of AND gate 102 and AND gate 132 are supplied to AND gate 138 resulting in a logic one at the output gate 138. In a like manner, the outputs of AND gate 148 and AND gate 176 are supplied to AND gate 182 resulting in a logic one at the output gate 182. In addition, the outputs of AND gate 162 and AND gate 192 are supplied to AND gate 196 resulting in a logic one at the output gate 196. The outputs of AND gates 122, 138, 182 and 196 are then supplied to AND gate 198 resulting in a logic one at the output of AND gate 198 which is provided through the M_SYNC output of decoder 62 to the first input of an AND gate 66.

Figure 4A:
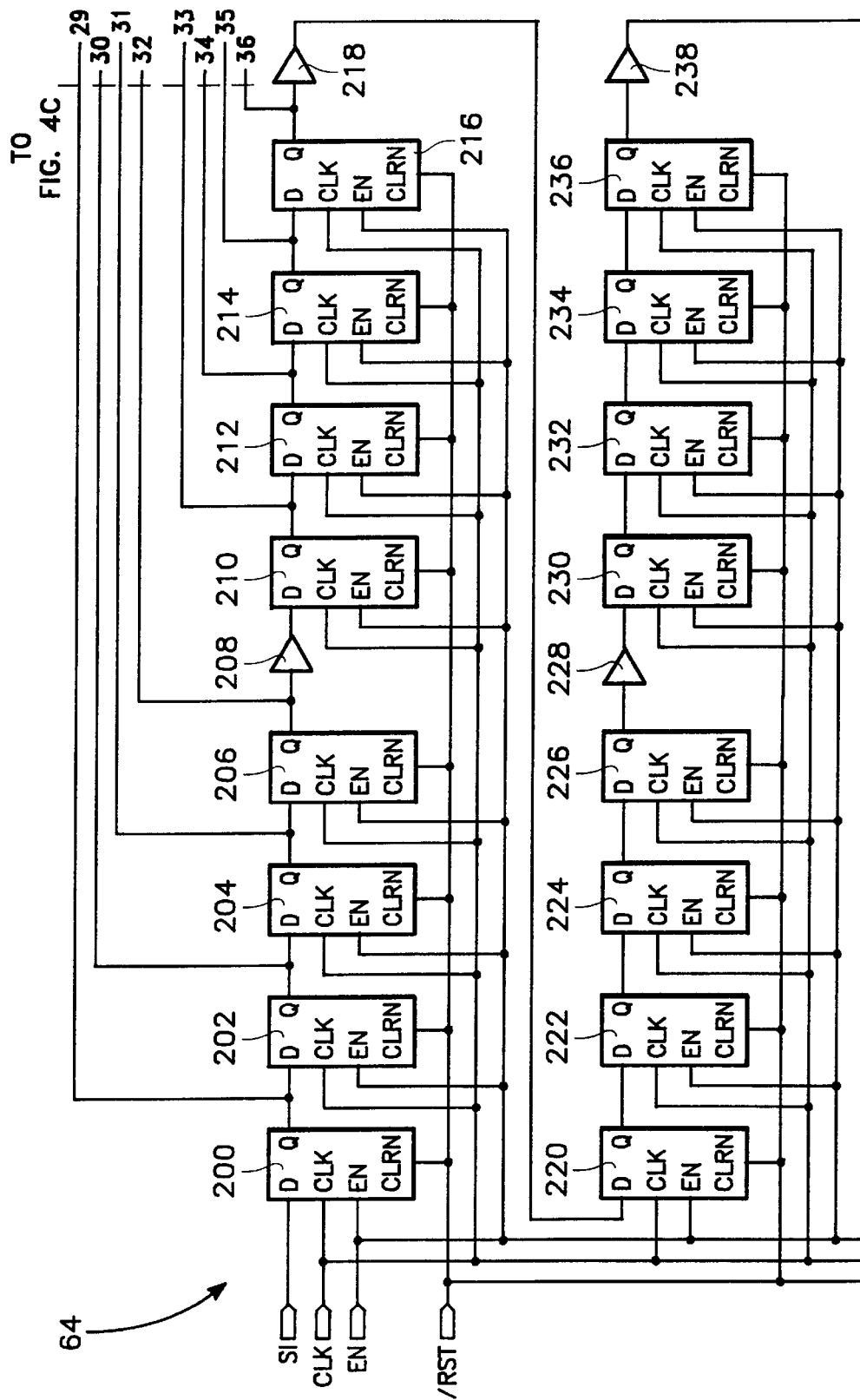
FIGS. 4A–4C is a detailed electrical schematic diagram of the least significant sync word decoder of FIG. 2.
Figure 4B:
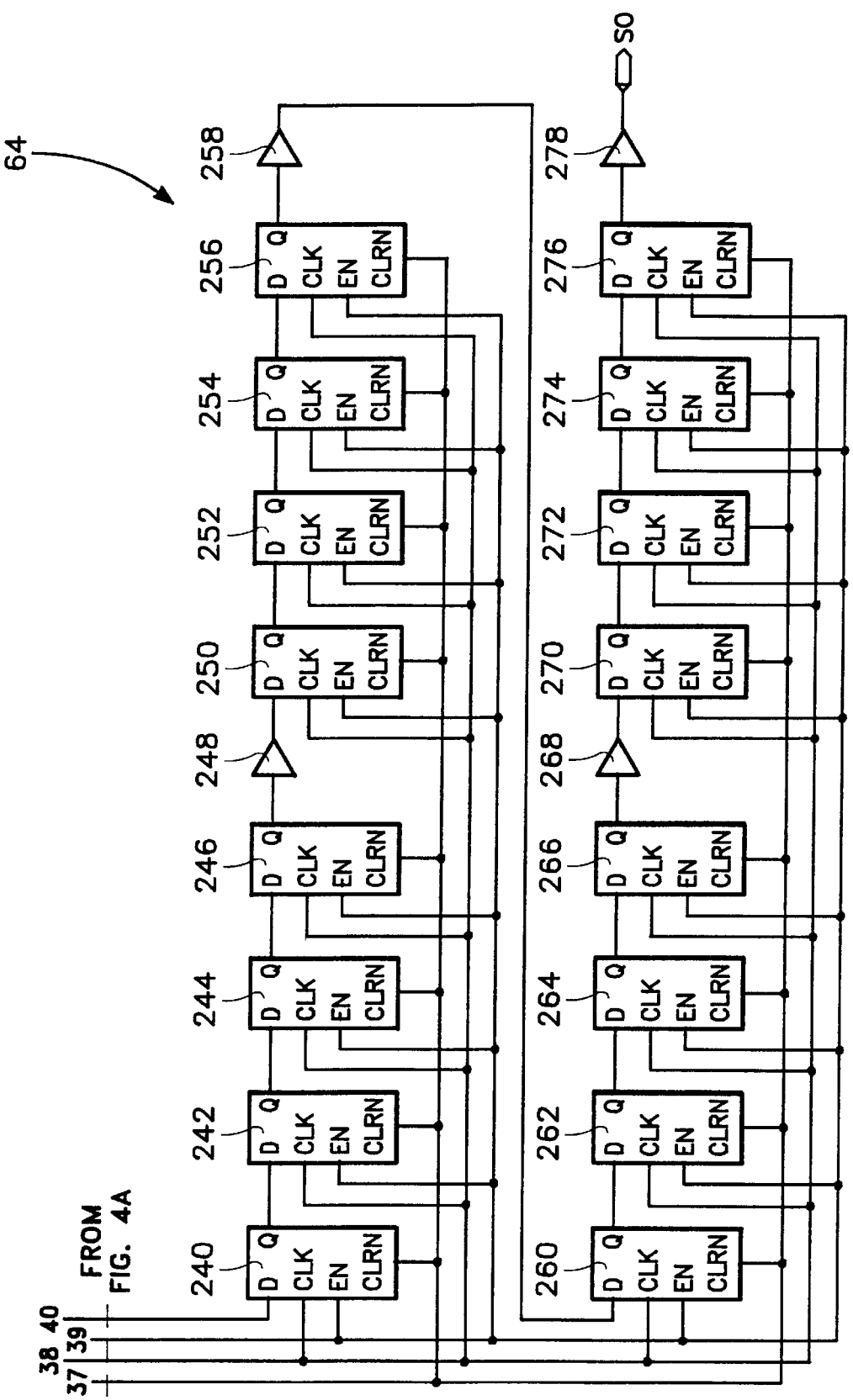
Figure 4C:
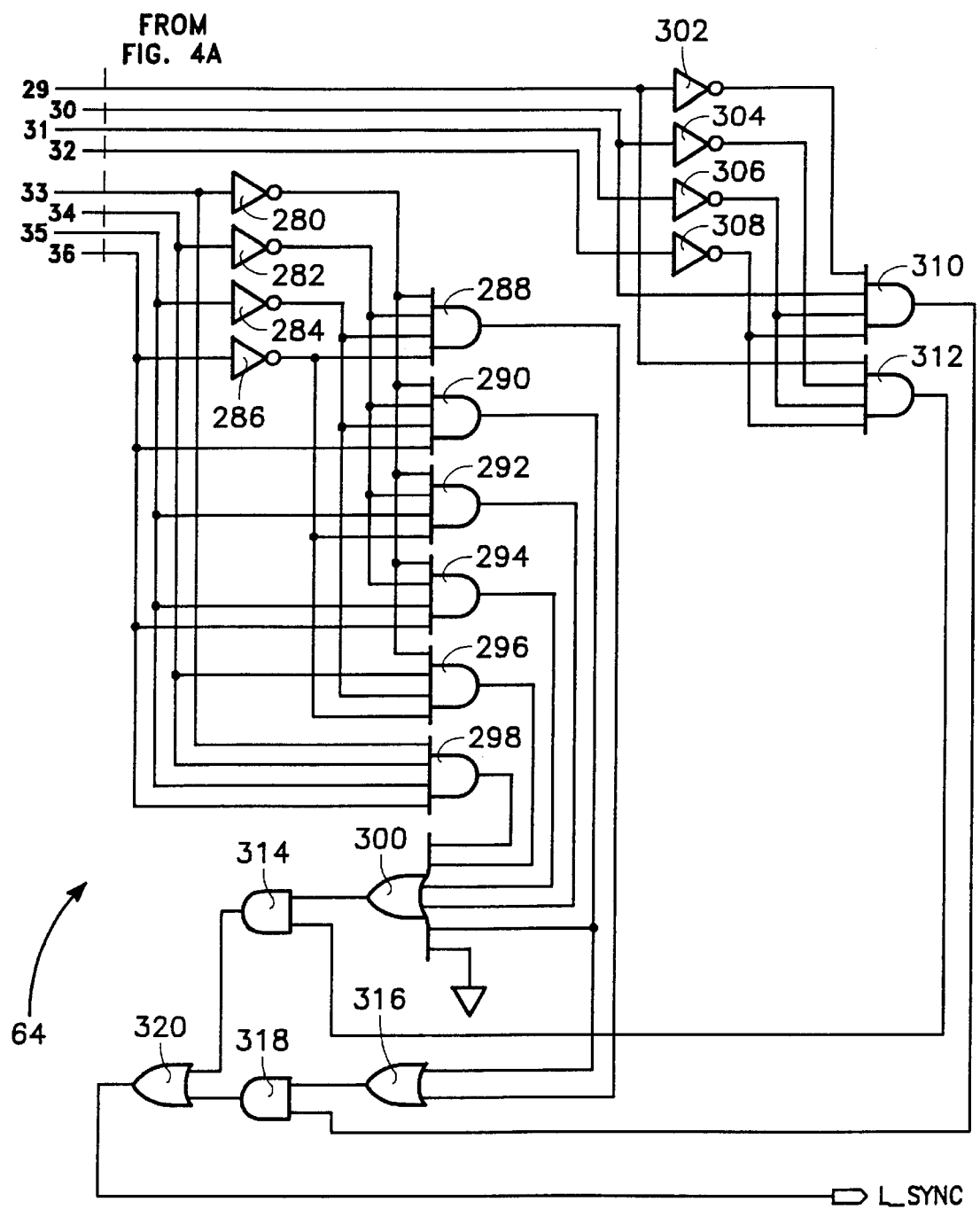
Figure 5:
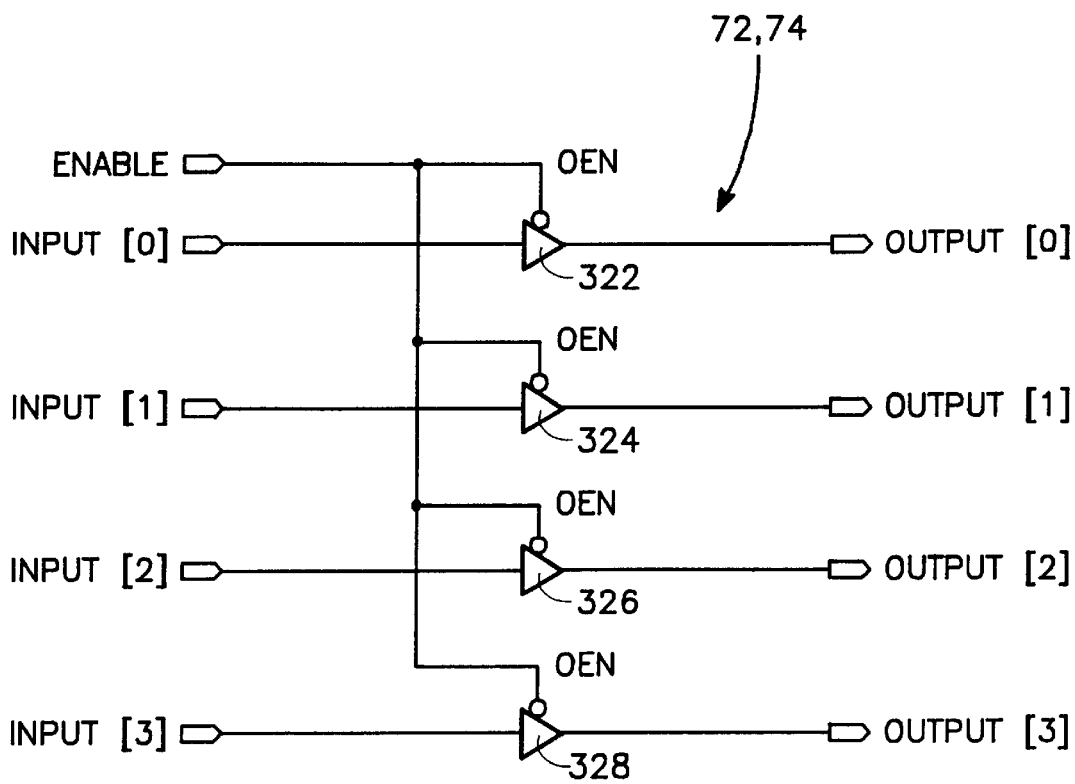
FIG. 5 is a detailed electrical schematic diagram of the quad tri-state buffers of FIG. 2.

Referring to FIGS. 1A–1F, 2 and 4A–4C, there is shown in FIGS. 4A–4C, the least significant sync word decoder 64 of the programmable gate array 30 of FIG. 2. Whenever decoder 62 indicates that the thirty two bit word being processed by decoder 62 may be the most significant word of a Mallat block header, decoder 64 will process the following word of the Mallat block to determine whether a Mallat block header is present. Whenever the M_SYNC output of decoder 62 is at the logic one state, a logic one at the L_SYNC output of decoder 64 indicates the presence of a Mallat block header. A logic zero at the L_SYNC output of decoder 64 indicates that the thirty two bit word being processed by decoder 62 is data.

The second or least significant thirty two bit word of the Mallat block header is shifted through latches 200–276 of decoder 64. The least significant word of the Mallat block header includes four eight bit bytes. The most significant byte (bits $b_7$–$b_0$) of the least significant word of the header which resides in latches 200, 202, 204, 206, 210, 212, 214 and 216 of decoder 46 is decoded by the logic circuitry illustrated in FIG. 4A–4C. Bits $b_7$–$b_4$ of the most significant byte of the least significant word of the header are supplied to inverters 302, 304, 306 and 308. Bit $b_7$ is also supplied to AND gate 312, while bit $b_6$ is supplied to AND gate 310. When the output of AND gate 312 is a logic one, a hexadecimal eight is being input to AND gate 312, that is bit $b_7$ is a logic one and bits $b_6$–$b_4$ are logic zeros. Similarly, when the output of AND gate 310 is a logic one a hexadecimal four is being input to AND gate 310, that is bit $b_6$ is a logic one and bits $b_7$, $b_5$ and $b_4$ are logic zeros.

Bits $b_3$–$b_0$ of the most significant byte of the least significant word of the header are supplied to inverters 280, 282, 284 and 286. Bit $b_3$ is also supplied to AND gate 298, bit $b_2$ is also supplied to AND gates 296 and 298, bit $b_1$ is also supplied to AND gates 294, 296 and 298 and bit $b_0$ is also supplied to AND gates 292, 294, 296 and 298. When the output of AND gate 288 is a logic one a hexadecimal zero is being input to AND gate 288, that is bits $b_3$–$b_0$ are logic zeros. In a like manner, when the output of AND gate 290 is a logic one a hexadecimal one is being input to AND gate 290, when the output of AND gate 292 is a logic one a hexadecimal two is being input to AND gate 292, when the output of AND gate 294 is a logic one a hexadecimal two is being input to AND gate 294, when the output of AND gate 296 is a logic one a hexadecimal three is being input to AND gate 296, and when the output of AND gate 298 is a logic one a hexadecimal "F" is being input to AND gate 298.

The logic signals from the outputs of AND gates 290, 292, 294, 296 and 298 are supplied through OR gate 300 to the first input of AND gate 314, while the logic signal output from AND gate 312 is supplied to the second input of AND gate 314. This results in a logic one at the output of AND gate 314 whenever the input signals provided thereto are hexadecimal 81, 82, 83, 84 or 8F.

The logic signals from the outputs of AND gates 288 and 290 are supplied through OR gate to the first input of AND gate 318, while the logic signal from the output of AND gate 310 is supplied to the second input of AND gate 318. This results in a logic one at the output of AND gate 318 whenever the input signals provided thereto are hexadecimal 40 or 41.

Since the outputs of AND gates 314 and 316 are respectively connected to the first and second inputs of OR gate 320, a logic one is generated at the output OR gate whenever the a hexadecimal 40, 41, 81, 82, 83, 84 or 8F is supplied to the inputs of OR gate 320. Thus, for example, when bits $b_7$–$b_0$ are respectively 1,0,0,0,1,1,1,1 (hexadecimal 8F) the output of OR gate 320 is a logic one. In a like manner, when bits $b_7$–$b_0$ are respectively 0,1,0,0,0,0,0,0 (hexadecimal 40) the output of OR gate 320 is a logic one.

The logic one generated at the output of OR gate 320 is provided through the M_SYNC output of decoder 64 to the second input of an AND gate 66. A logic one at the first input of AND gate 66 results in a logic one at the output of AND gate 66 which is then supplied to the SYNC input of read write controller 68 and the SNYC input of byte select controller 70. This logic one operates as the synchronization signal for programmable gate array 70 indicating that the header for a new block of Mallat data has been detected by decoders 62 and 64 of programmable gate array 30.

Referring to FIGS. 1A, 1B, 2 and 5, programmable gate array 30 has a pair of tri-state buffers 72 and 74 which are tri-stated when their enable input is at the logic one state. When the enable input to tri-state buffers 72 and 74 is low buffers 72 and 74 are enabled. Enabling tri-state buffers 72 and 74, in turn, allows logic signals to pass through buffers 322, 324, 326 and 328 to the OUT0, OUT1, OUT2 and OUT3 outputs of tri-state buffers 72 and 74.

Microcontroller 56 supplies an initialize signal to array 30 via its INIT output which is then provided to the ENABLE inputs of buffers 72 and 74. The initialize signal allows microcontroller 56 to communicate with codec 24 while the control signals between codec 24 and array 30 are disabled.

Figure 6:
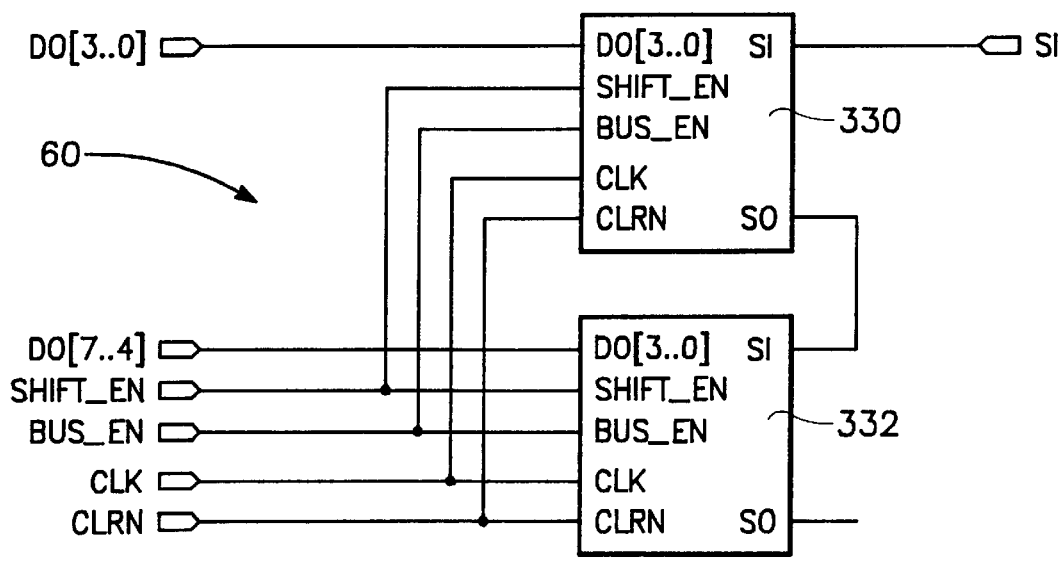
FIG. 6 is an electrical block diagram of the eight bit serial to parallel shift register of FIG. 2.
Figure 7:
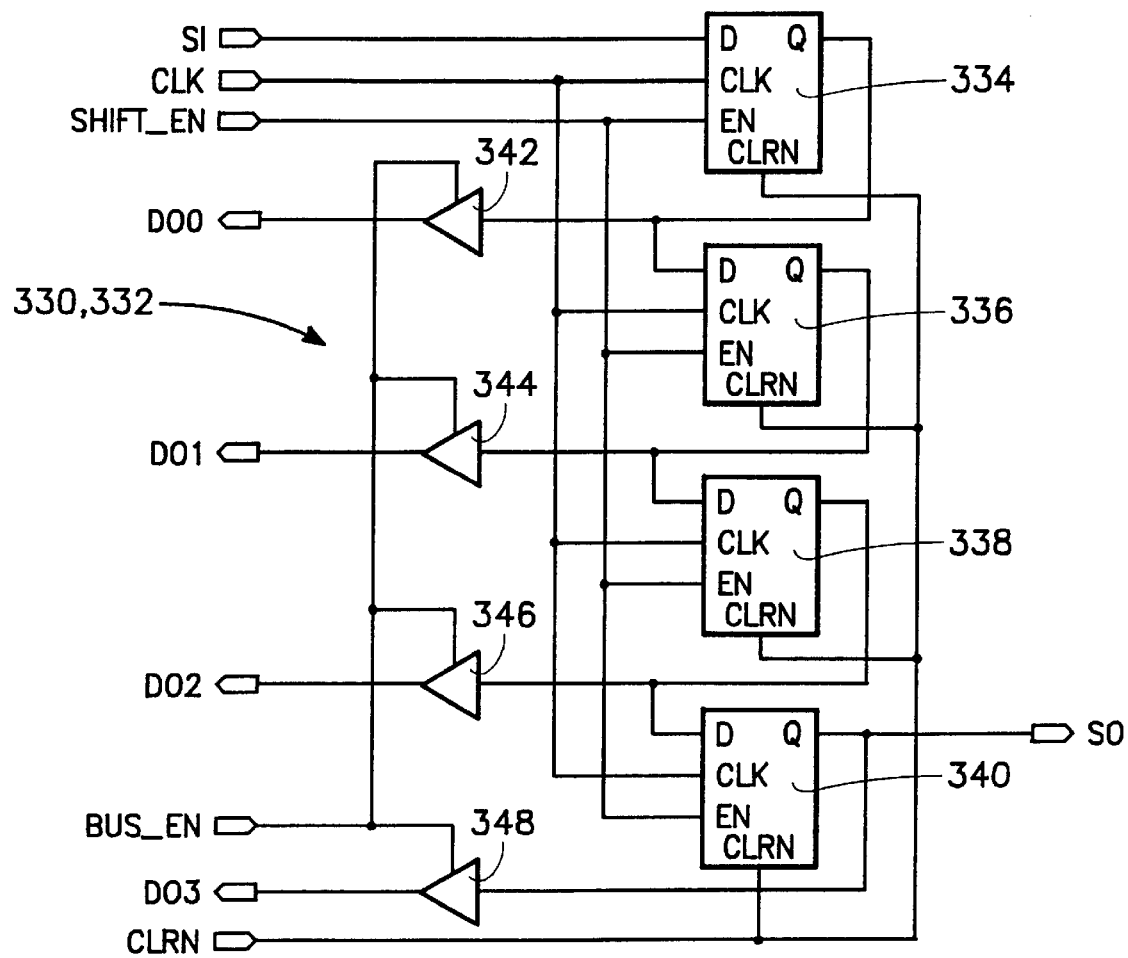
FIG. 7 is a detailed electrical schematic diagram of the four bit serial to parallel shift registers of FIG. 6.

Referring to FIGS. 1A, 1B, 2, 6, 7 and 8, programmable gate array 30 has an eight bit serial to parallel shift register 60 which converts incoming serial Mallat block data into eight bit parallel bytes of data for processing by multiformat video codec 24. As depicted in FIG. 6, shift register 60 includes a pair of four bit serial to parallel shift registers 330 and 332 with the SO output of shift register 330 being connected to the SI input of shift register 332. Each shift register 330 and 332 has four enabled latches 334, 336, 338 and 340 configured to convert a four bit incoming serial data stream to a four parallel data bits. Each latch 334, 336, 338 and 340 provides at its Q output one of the four parallel data bits which pass through buffers 342, 344, 346 and 348 to the DO0, DO1, DO2 and DO3 outputs of register 330 and 332 when the BUS_EN (bus enable) signal from read write controller 68 is at the logic one state.

Figure 8:
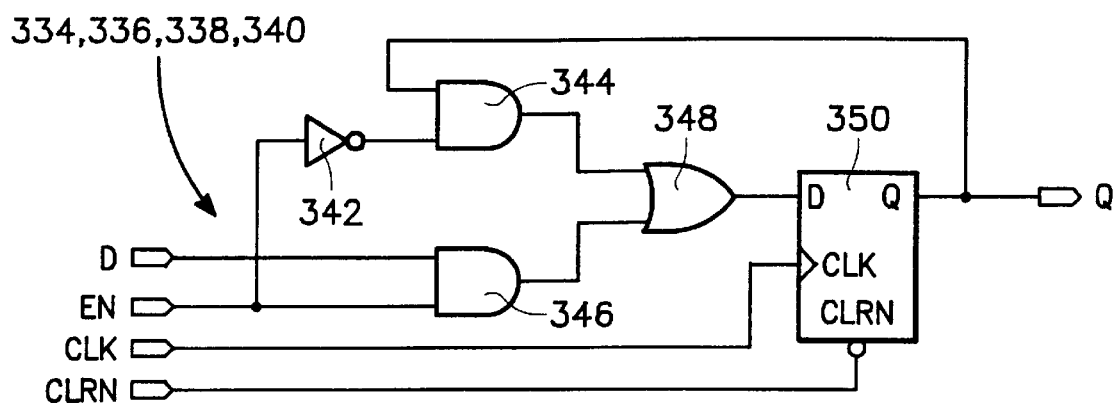
FIG. 8 is a detailed electrical schematic diagram of the latches of the four bit serial to parallel shift registers of FIG. 7.

Each latch 334, 336, 338 and 340 comprises a D type flip-flop 350 and its associated logic gates which are depicted in FIG. 8. When the shift enable (SFT_EN) signal from read write controller 68 is a logic one, video data bits will pass through AND gate 346 and OR gate 348 to the D input of flip-flop 350. The clock signal from the external host processor then clocks each video data bit through flip-flop 350 to its Q output. The active high shift enable signal allows data to be clocked through latches 334, 336, 338.and 340 of four bit serial to parallel shift registers 330 and 332 and thus the incoming serial data stream of video data to be converted from a serial format to a parallel format.

When the shift enable signal is a logic zero, AND gate 346 is disabled which prevents incoming video data from passing through AND gate 346. Inverter 342 inverts the shift enable signal resulting in a logic zero being supplied to the first input of AND gate 344 enabling AND gate 344. The data bit at the Q output of flip-flop 350 is then clocked through AND gate 344 and OR gate 348 to the D input of flip-flop 350 and will continue to circulate through flip-flop 350, AND gate 344 and OR gate 348 until the shift enable signal is again active.

Byte select controller 70 sequences the four byte enable signals /BE0, /BE1, /BE2 and /BE3 for each thirty two bit word written into codec 24. The synchronization signal (BLK_SYNC) from AND gate 66 resets a state machine within byte select controller 70 to state zero. The initialize signal provided to the INIT input of byte select controller 70 disables byte select controller 70 when microcontroller 56 is initializing codec 24. The clock signal supplied to the CLK signal (which may be within a range of approximately 2 megahertz to 20 megahertz) is the clock for the internal state machine of byte select controller 70. The chip select signal supplied to the CS input of byte select controller 70 is used to sequence the byte select outputs /BE0, /BE1, /BE2 and /BE3 of controller 70. When the chip select signal transitions to the logic zero state, one of the byte select outputs /BE0, /BE1, /BE2 and /BE3 of controller 70 will be activated to the logic zero state. When the chip select signal transitions to the logic one state the state machine within controller 70 transitions to the next sequential byte select outputs /BE0, /BE1, /BE2 or /BE3 of controller 70. When, for example, byte select output /BE0 is low, a logic one provided to the CS input of controller 70 will allow the state machine of controller 70 to sequence to the /BE1 of controller 70. The /BE1 output is then activated to a logic zero state when the CS input transitions to the logic zero state.

At this time it should be noted that the synchronization signal supplied by AND gate 66 will reset controller 70 to its initial state such that the /BE0 output will transition to the logic one state when the CS input of controller 70 first transitions to the logic zero state. It should also be noted that the bank enable zero signal allows the least significant byte of a 32 bit video word to be written into codec 24 for processing thereby, while the bank enable three signal allows the most significant byte of a 32 bit video word to be written into codec 24.

Read write controller 68 includes one state machine which generates the active low write signal provided to codec 24 to write each eight bit byte of a 32 bit video data word into codec 24. The state machine of read write controller 68 also generates the active low chip select signal supplied to controller 70. In addition, the state machine of read write controller 68 generates address bits A0 and A1 for codec 24. Address signals ADR0 and ADR1 address the FIFO within codec 24 which is at address two.

It should be noted at this time that the BUS_EN and SFT_EN outputs of programmable gate array 30 are test points used to monitor the operation of array 30.

Codec 24 provides four input signals through the F_ERR, F_SRQ, F_STP and LCODE inputs of programmable gate array 30 to the F_ERR, F_SRQ, F_STP and LCODE inputs of read write controller 68. These signals are not used to effect the operation of programmable gate array 30.

An active low pulsed reset signal is provided from P3.0 of microcontroller 56 to the /RESET input of codec 24 and the /RESET input of array 30. This pulsed reset signal resets the decoders 62 and 64 and controllers 68 and 70 within array 30 and functions as the hardware reset for codec 24.

Microcontroller 56 also provides via P3.1 an INIT signal to the INIT input of array 30. When the INIT signal is low, the INIT signal indicates to array 30 that array 30 is now controlling the operation of video encoder 20. When microcontroller 56 sets the INIT signal high, microcontroller 56 initializes codec 24 and also indicates to array 30 that codec 24 is being initialized which results in array 30 being taken off line.

Referring to FIGS. 1E and 1F, pad 57 splits incoming voltage VCC into a digital voltage DVCC and an analog voltage AVCC. Similarly, an incoming ground GND is split into a digital ground DGND and an analog ground AGND as well as a shielded ground SHLD_GND which blocks noise. Capacitors C2, C3, C6, C7, C8, C9, C10, C11 and C12 are used to filter digital power thereby providing a clean power source for the digital integrated circuits of video encoder 20.

From the foregoing, it may readily be seen that the present invention comprises a new, unique and exceedingly useful video decoder which constitutes a considerable improvement over the known prior art. Obviously, many modifications and variations of the present invention are possible in light of the above teachings. It is, therefore to be understood that within the scope of the appended claims that the invention may be practiced otherwise than as specifically described.

What is claimed:

1. Apparatus for decoding a serial video data stream having at least one header, said apparatus comprising:
   a programmed gate array for receiving said serial video data stream and an external clock signal;
   said programmed gate array detecting said at least one header, said programmed gate array converting said serial video data stream into a plurality of video data words having first, second, third and fourth data bytes whenever said programmed gate array detects said at least one header;
   said programmed gate array generating a write signal and first, second, third and fourth byte enable signals whenever said programmed gate array detects said at least one header;
   a video decoder connected to said programmed gate array to receive said write signal, said first, second, third and fourth byte enable signals and said first, second, third and fourth data bytes of each of said plurality of video data words;
   said video decoder having said first, second, third and fourth data bytes of each of said plurality of video data words written therein in response to said write signal and said first, second, third and fourth byte enable signals;
   said video decoder decompressing said first, second, third and fourth data bytes of each of said plurality of video data words using a decompression algorithm having a bi-orthogonal (7, 9) wavelet transform to generate a plurality of decoded video data words representing a video image; and
   a microcontroller connected to said video decoder, said microcontroller initializing said video decoder allowing said video decoder to decompress said first, second, third and fourth data bytes of each of said plurality of video data words using said decompression algorithm, said microcontroller initializing said video decoder when power is supplied to said video decoder.

2. The apparatus of claim 1 further comprising a random access memory connected to said video decoder, said random access memory operating as a temporary storage device for video data being processed by said video decoder.

3. The apparatus of claim 1 wherein each of said plurality of video data words comprises a thirty two bit parallel video data word.

4. Apparatus for decoding a serial video data stream having at least one header, said apparatus comprising:
   a programmed gate array for receiving said serial video data stream and an external clock signal;
   said programmed gate array detecting said at least one header;
   said programmed gate array including a serial to parallel shift register for converting said serial video data stream into a plurality of video data words having first, second, third and fourth data bytes whenever said programmed gate array detects said at least one header;
   said programmed gate array including a read write controller for generating a write signal and a chip select signal whenever said programmed gate array detects said at least one header;
   said programmed gate array including a byte select controller for generating first, second, third and fourth byte enable signals whenever said programmed gate array detects said at least one header;
   a video decoder connected to said read write controller and said byte select controller to receive said write signal, said chip select signal and said first, second, third and fourth byte enable signals;
   said video decoder being connected to said serial to parallel shift register to receive said first, second, third and fourth data bytes of each of said plurality of video data words;
   said video decoder having said first, second, third and fourth data bytes of each of said plurality of video data words written therein in response to said write signal, said chip select signal and said first, second, third and fourth byte enable signals;
   said video decoder decompressing said first, second, third and fourth data bytes of each of said plurality of video data words using a decompression algorithm having a bi-orthogonal (7, 9) wavelet transform to generate a plurality of decoded video data words representing a video image; and
   a microcontroller connected to said video decoder, said microcontroller initializing said video decoder allowing said video decoder to decompress said first, second, third and fourth data bytes of each of said plurality of video data words using said decompression algorithm, said microcontroller initializing said video decoder when power is supplied to said video decoder.

5. The apparatus of claim 4 further comprising a random access memory connected to said video decoder, said random access memory operating as a temporary storage device for video data being processed by said video decoder.

6. The apparatus of claim 4 wherein said serial to parallel shift register comprises an eight bit serial to parallel shift register having first and second four bit serial to parallel shift registers.

7. The apparatus of claim 6 wherein each of said first and second four bit serial to parallel shift registers comprises:
   a first enabled latch having a data input for receiving said serial video data stream, a clock input for receiving said external clock signal, an enable input for receiving a shift enable signal generated by said read write controller and a Q output;
   a first buffer having a first input connected to the Q output of said first enabled latch, a second input for receiving a bus enable signal generated by said read write controller and an output connected to said video decoder;
   a second enabled latch having a data input connected to the Q output of said first enabled latch, a clock input for receiving said external clock signal, an enable input for receiving said shift enable signal and a Q output;
   a second buffer having a first input connected to the Q output of said second enabled latch, a second input for receiving said bus enable signal and an output connected to said video decoder;
   a third enabled latch having a data input connected to the Q output of said second enabled latch, a clock input for receiving said external clock signal, an enable input for receiving said shift enable signal and a Q output;
   a third buffer having a first input connected to the Q output of said third enabled latch, a second input for receiving said bus enable signal and an output connected to said video decoder;
   a fourth enabled latch having a data input connected to the Q output of said third enabled latch, a clock input for receiving said external clock signal, an enable input for receiving said shift enable signal and a Q output; and
   a fourth buffer having a first input connected to the Q output of said fourth enabled latch, a second input for receiving said bus enable signal and an output connected to said video decoder.

8. The apparatus of claim 7 wherein each of said first, second, third and fourth enabled latches comprises:
   a first AND gate having a first input for receiving said shift enable signal, a second input for said serial video data and an output;
   an inverter having an input for receiving said shift enable signal and an output;
   a second AND gate having a first input connected to the output of said inverter, a second input and an output;
   an OR gate having a first input connected to the output of said first AND gate, a second input connected to the output of said second AND gate and an output; and
   a Flip-Flop having a data input connected to the output of said OR gate, a clock input for receiving said external clock signal and a Q output connected to the second input of said AND gate.

9. The apparatus of claim 4 wherein said read write controller comprises a state machine for generating said write signal and said chip select signal.

10. The apparatus of claim 4 wherein said byte select controller comprises a state machine for generating said first, second, third and fourth byte enable signals.

11. The apparatus of claim 4 wherein each of said plurality of video data words comprises a thirty two bit parallel video data word.

12. Apparatus for decoding a serial video data stream having at least one header, said apparatus comprising:
   a programmed gate array for receiving said serial video data stream and an external clock signal;
   said programmed gate array including a sync word decoder for detecting said at least one header, said sync word decoder generating a sync signal whenever said sync word decoder detects said at least one header;
   said programmed gate array including a read write controller, said read select controller, responsive to said sync signal, generating a write signal, a shift enable signal, a bus enable signal and a chip select signal;
   said programmed gate array including a serial to parallel shift register, said serial to parallel shift register, responsive to said shift enable signal, said bus enable signal and said external clock signal converting said serial video data stream into a plurality of video data words having first, second, third and fourth data bytes;
   said programmed gate array including a byte select controller, said byte select controller, responsive to said sync signal, said chip select signal and said external clock signal, generating first, second, third and fourth byte enable signals;
   a video decoder connected to said read write controller and said byte select controller to receive said write signal, said chip select signal and said first, second, third and fourth byte enable signals;
   said video decoder being connected to said serial to parallel shift register to receive said first, second, third and fourth data bytes of each of said plurality of video data words;
   said video decoder having said first, second, third and fourth data bytes of each of said plurality of video data words written therein in response to said write signal, said chip select signal and said first, second, third and fourth byte enable signals;
   said video decoder decompressing said first, second, third and fourth data bytes of each of said plurality of video data words using a decompression algorithm having a bi-orthogonal (7, 9) wavelet transform to generate a plurality of decoded video data words representing a video image; and
   a microcontroller connected to said video decoder, said microcontroller initializing said video decoder allowing said video decoder to decompress said first, second, third and fourth data bytes of each of said plurality of video data words using said decompression algorithm, said microcontroller initializing said video decoder when power is supplied to said video decoder.

13. The apparatus of claim 12 further comprising a random access memory connected to said video decoder, said random access memory operating as a temporary storage device for video data being processed by said video decoder.

14. The apparatus of claim 12 wherein said serial to parallel shift register comprises an eight bit serial to parallel shift register having first and second four bit serial to parallel shift registers.

15. The apparatus of claim 14 wherein each of said first and second four bit serial to parallel shift registers comprises:

a first enabled latch having a data input for receiving said serial video data stream, a clock input for receiving said external clock signal, an enable input for receiving a shift enable signal generated by said read write controller and a Q output;

a first buffer having a first input connected to the Q output of said first enabled latch, a second input for receiving a bus enable signal generated by said read write controller and an output connected to said video decoder;

a second enabled latch having a data input connected to the Q output of said first enabled latch, a clock input for receiving said external clock signal, an enable input for receiving said shift enable signal and a Q output;

a second buffer having a first input connected to the Q output of said second enabled latch, a second input for receiving said bus enable signal and an output connected to said video decoder;

a third enabled latch having a data input connected to the Q output of said second enabled latch, a clock input for receiving said external clock signal, an enable input for receiving said shift enable signal and a Q output;

a third buffer having a first input connected to the Q output of said third enabled latch, a second input for receiving said bus enable signal and an output connected to said video decoder;

a fourth enabled latch having a data input connected to the Q output of said third enabled latch, a clock input for receiving said external clock signal, an enable input for receiving said shift enable signal and a Q output; and a fourth buffer having a first input connected to the Q output of said fourth enabled latch, a second input for receiving said bus enable signal and an output connected to said video decoder.

16. The apparatus of claim 15 wherein each of said first, second, third and fourth enabled latches comprises:

a first AND gate having a first input for receiving said shift enable signal, a second input for said serial video data and an output;

an inverter having an input for receiving said shift enable signal and an output;

a second AND gate having a first input connected to the output of said inverter, a second input and an output;

an OR gate having a first input connected to the output of said first AND gate, a second input connected to the output of said second AND gate and an output; and a Flip-Flop having a data input connected to the output of said OR gate, a clock input for receiving said external clock signal and a Q output connected to the second input of said AND gate.

17. The apparatus of claim 12 wherein said read write controller comprises a state machine for generating said write signal and said chip select signal.

18. The apparatus of claim 12 wherein said byte select controller comprises a state machine for generating said first, second, third and fourth byte enable signals.

19. The apparatus of claim 12 wherein each of said plurality of video data words comprises a thirty two bit parallel video data word.

* * * * *